2,821,547
PYROLYSIS OF MYRTENYL COMPOUNDS TO MONOCYCLICS AND ACYCLICS

Eugene A. Klein, Jacksonville, Fla., assignor to The Glidden Company, Cleveland, Ohio, a corporation of Ohio No Drawing. Application June 12, 1953
Serial No. 361,419

10 Claims. (Cl. 260—489)

This invention is concerned with the thermal isomerization of myrtenyl compounds to perillyl compounds and certain other valuable products.

It is known that myrtenol is present in certain natural essential oils and also that myrtenol and myrtenaldehyde may be produced synthetically as by selenium dioxide oxidation of $\alpha$-pinene or air oxidation of $\beta$-pinene followed by certain suitable recovery steps. It is also known to convert myrtenol to myrtenal. Numbers of esters of myrtenol are known as well as myrtenyl chloride and bromide, myrtenyl ethyl ether, myrtenic acid, etc. We have found that myrtenol, its derivatives and analogues are capable of yielding corresponding perillyl compounds when treated thermally, and, in addition, certain novel and valuable isomers are produced. Perillylaldehyde and perillyl alcohol are constituents of certain natural oils. It is known to convert the alcohol to the aldehyde and the reverse.

Perillyl compounds are valuable not only as odorant and flavoring materials but are suitable intermediates for producing perillaldoxime, one form of which is known to be a very powerful sweetening agent suited for uses such as sweetening tobacco and foods. It is desirable, therefore, to provide a process for converting myrtenyl compounds to members of the perillyl series.

Accordingly, among the objects of this invention are:

To provide a process for converting members of the myrtenyl group to members of the perillyl group.

To provide a process for converting myrtenol to perillyl alcohol and other valuable compounds.

To provide a process for converting myrtenal to perillaldehyde and other valuable compounds.

To provide a process for converting myrtenyl compounds to a sweetening agent.

To provide a process for converting the cheap and available pinenes to valuable members of the perillyl group of compounds.

To provide a process for converting myrtenyl compounds to novel acyclic compounds of the allo-ocimene type.

To provide a process for converting myrtenyl compounds to novel compounds of the pyronene type.

To provide a process for converting pinene oxygenated at the 7-position to 1,8-p-menthadiene oxygenated at the 7-position.

Other valuable objects will be apparent to those skilled in the art.

I have found that myrtenyl compounds when heated in the vapor phase or in the liquid phase yield the corresponding perillyl compounds accompanied by isomeric allo-ocimene and pyronene type compounds and that polymeric material is also produced in the pyrolysis and/or purification procedures and that this polymeric material contains allo-ocimene type polymer. The proportions of the various classes of compounds that can be isolated depends on the pyrolysis conditions and the procedures employed in working up the products of pyrolysis.

The starting myrtenyl compound may be produced by any convenient method and may be of either optical sign or racemic. In general, thermal racemization occurs to such an extent in the process that the products of pyrolysis possess but feeble optical activity irrespective of the high degree of optical activity possessed by the initial myrtenyl compound.

The myrtenyl compound is suitably treated at about 225° C. to 700° C. for a time sufficiently long to bring about its substantial conversion to the corresponding acyclic and monocyclic compounds. The time required is related inversely to the temperature employed. Thus, the myrtenyl compound may require heating for several hours in the lower temperature ranges or for only a small fraction of a second at the higher temperature ranges. The upper temperature limit is one imposed by equipment problems rather than a limitation of the pyrolysis. In general, it will be found convenient to operate in the liquid phase and for longer periods of time where the temperature to be maintained is of the order of 225° to 300° C., and in the vapor phase where a temperature of 400° C. or above is employed, though liquid phase pyrolysis at high temperatures and short contact times, as by continuous feed through a pyrolysis tube under pressure maintained by a pump, is satisfactory also. Where the boiling point of the myrtenyl compound is of the order of 225° C. or above, then heating at or below the reflux temperature is generally satisfactory, but for the lower boiling myrtenyl compounds, such as myrtenyl methyl ether, faster conversions will be attained by autoclaving. Of course, if the myrtenyl compound employed is a high boiling material so that it cannot be readily vaporized by heat or by heat assisted by sparging with an inert gas, then it is most suitably treated in the liquid phase.

I have found that the pyrolysis product may be conveniently separated into fractions enriched in the various pyrolysis products by means of fractional distillation most suitably in vacuo where the boiling point is high or where the product is not completely stable at its boiling point at atmospheric pressure. Alternatively, the reactive pyrolysis mixture can be subjected to other separation processes, or, if desired, it can be converted to derivatives which can then be separated by taking proper advantage of the differences in physical and/or chemical properties that exist in the types of compounds in hand.

It has been found that suitable myrtenyl compounds for conversion to perillyl compounds and the other classes of thermal conversion products include myrtenol, myrtenal, acetals and cycloketals, myrtenyl ethers and esters and, in general, those compounds bearing substituents on the 7-carbon atom of the pinene structure. It is preferred, however, for best results not to use those compounds whose substituents are of such a nature that under the influence of heat they cause undesirable dehydration, polymerization or otherwise adversely affect the course of the pyrolysis, such, for example, as myrtenyl sulfate or acid sulfate, etc. In other cases, such as for the formation of perillyl halides, better results are obtained by pyrolysis of myrtenol followed by conversion of the monocyclic alcohol to the halide. Further, where the primary pyrolysis products are desired, the pyrolysis of such esters as maleic esters is not desirable, since the initial pyrolysis products would tend to resinify due to the presence of mixed dienophiles. In the case of the aldehyde, similar condensable systems are inherently present in the pyrolysis mixture and when pyrolyzing myrtenal, it is desirable to avoid unnecessary conditions accelerating the condensation reaction, unless resinous products are the ones desired.

In general, therefore, since the myrtenyl compound most readily and initially available from synthesis mixtures are the aldehyde, alcohol and esters, when ester type separation has been employed to separate the synthesis mixture, and since these products are well suited to pyrolysis, we prefer to employ these compounds fo pyrolysis and to convert their pyrolysis products to other derivatives after pyrolysis if and as desired.

The flow sheet indicates the nature of the pyrolysis which myrtenyl compounds undergo. As a specific example, the conversion of myrtenal to perilladehyde and other volatile compounds is shown. The non-volatile material produced is presumed to be largely an alloocimene aldehyde polymer or condensation product. The cyclohexadiene aldehydes are presumed to be derived by cyclization of allo-ocimene aldehyde. The allo-ocimene aldehyde and its cyclization and polymerization products are useful as dienophiles for manufacture of resinous products, whereas the allo-ocimene aldehyde and its cyclization products also condense with acetaldehyde, acetone, etc. to form products of pleasant characteristic odors. Perillaldehyde also condenses with acetone, etc., as is known, and also converts readily to the intensely sweet oxime.

The pyrolysis product produced by heating the myrtenyl compound is readily separable by fractional distillation where the products are sufficiently volatile and enriched or pure fractions of the acyclic, the conjugated cyclohexadiene and the perillyl compound can be separated and the individual components can be subjected to other conversions such as either selective or saturative hydrogenation, oxidation, etc. Alternatively, it will be found convenient in certain cases to react the whole pyrolysis product and then separate the desired pure derivatives. Thus, perillyl acetate can be prepared by separating the perillyl alcohol from the pyrolysis product of myrtenol, then esterifying it, or it can be prepared by esterifying the whole pyrolysis product, then separating the desired ester. If rather sensitive compounds are involved, as in the case of the aldehyde constituents of myrtenal pyrolysis, it is found preferable in some cases to condense with acetone, hydroxylamine, etc. and then fractionate the more stable derivatives when it is desired to produce those derivatives.

The following examples are illustrative of our invention.

EXAMPLE 1

Pure myrtenol (500 g., $n_D^{25}$ 1.4950, $\alpha_D^{25}$ —49° [10 cm. tube]) was pyrolyzed in the vapor phase by introducing the liquid dropwise at 2 cc./min. down the side of a vertical ¼" standard iron pipe maintained at 400° C. The tmeperature was determined from a thermocouple inserted down the center of the pipe.

An infrared spectrogram on the total pyrolysate showed:

(1) That it contained very little unchanged myrtenol;
(2) An absorption band at 13.7μ, characteristic of α- and β-pyronene;
(3) $CH_2=C<$ absorptions at 11.25μ and 6.0μ;
(4) A carbon to carbon conjugation absorption at 6.23μ;
(5) A broad primary alcohol absorption between 9.4μ and 10.45μ; and
(6) A carbonyl absorption at 5.95μ.

The ultraviolet spectrogram of the pyrolysate showed $\lambda_{max}$ at 278 mμ and inflection points at about 270 mμ and 286 mμ to form a curve of the shape exhibited by alloocimene type compounds and related conjugated trienes.

The product was fractionally distilled using an efficient column packed with glass helices. The column was operated at 10 mm., absolute pressure, to a head temperature of 97° C. and then the absolute pressure was dropped stepwise to a final value of 0.5 mm., and the distillation continued to a pot temperature of 260° C. Twenty-two fractions were collected throughout the distillation and ranged in size from 3.0 to 29.5 grams. Infrared and ultraviolet spectrograms were made for most of the fractions and these indicated the number of major pyrolysis products as well as the composition and quantity of the major products. The following compounds in order of their increasing boiling points were found to be present:

(A) Carbonyl and alcohol compounds of unknown structure comprised the fractions boiling from 53–85° C. at 10 mm. The presence of the functional groups specified was shown by infrared spectrophotometric analysis.

(B) α-Pyronene and β-pyronene alcohols, α-isomer, 5,5,6-trimethyl-1,3-cyclohexadiene-1-carbinol, and β-isomer, 1,6,6-trimethyl-1,3-cyclohexadiene-2-carbinol, were the major components of the fractions boiling from 85–97° C. at 10 mm., and 53–60° C. at 0.5–0.15 mm. The refractive index of the fraction richest in these alcohols was 1.4987 at 25° C. They were identified and characterized as follows:

(1) The ultraviolet spectrograms of the fractions containing these products had $\lambda_{max}$ at 264 mμ in iso-octane and a specific extinction coefficient $$(\alpha = E_{1cm}^{1\%}) \text{ of } 22\text{--}27$$

The $\lambda_{max}$ reported in the literature for the α- and β-pyronenes is 264 mμ, and an α of 39–41.5. The higher value of the extinction coefficient is to be expected for the hydrocarbons because of the higher concentration of the particular conjugate system exhibiting ultraviolet absorption in the hydrocarbons as compared to the higher molecular weight of the alcohols and the corresponding lower concentration of the absorbing system in the latter.

(2) The infrared spectrograms of the fractions containing the products had a broad major absorption at 13.7–13.9μ which covers the range of the major absorptions in α- and β-pyronene. Also present in the spectra of the products was a broad alcohol absorption between 9.3μ and 10.2μ which is in the region for a non-associated primary alcohol absorption. The alcohols consequently contained the pyronene nucleus and were primary alcohols and therefore are the products specified. This mixture of alcohols is characterized further by possessing infrared absorption bands at 8.27, 8.55, 8.82, 9.53, 9.95, 10.95, 11.25, 11.50, 12.45 and 13.73μ. These bands vary somewhat in relative intensity from fraction to fraction thus indicating the presence of two pyronene alcohols even in the purest fraction obtained. The remainder of the spectrum of the products was also very similar to that of the pyronenes.

(C) Perillyl alcohol, $n_D^{25}$ 1.5021, $\alpha_D^{25}$ —0.84° in a 10 cm. tube, was the primary product found in the fraction boiling between about 60–65° C. at about 0.15 mm. The low rotation of the best fraction was attributed to racemization during pyrolysis. It was identified and characterized as follows:

(1) The major infrared absorptions of the fractions were at these wavelengths: 13.20, 12.87, 12.18, 11.24, 10.89, 10.02, 9.80, 9.47, 9.00, 8.71, 8.58, 8.08, 7.22, 6.00, 3.00μ. From the wavelength, shape and optical densities of the absorptions, the compound was found to contain these groups:

(a) Broad primary alcohol absorption between 9.3 and 10.2μ.
(b) $CH_2=C<$ absorptions at 6.05, 10.85 and 11.2μ, the last two forming a doublet of the shape and intensity as in the spectrum of limonene. The 11.2μ absorption is of much higher optical density than the one at 10.85μ, like limonene.
(c) A tri-substituted ethylene absorption at 12.1–12.4μ. This is a slight displacement from a similar absorption in limonene. The displacement is probably due to the fact that the double bond is part of an allylic system which is not present in limonene.

(2) The compound when refluxed with concentrated hydrochloric acid formed cymene, thus showing it to be a p-menthane derivative.

This evidence conclusively shows the product to be perillyl alcohol.

(D) An alloocimene alcohol, 2-methyl-2,4,6-octatriene-6-carbinol, was the chief material present in the fractions boiling 72–95° C. at 0.5 mm. It was identified and characterized by spectrophotometric methods as follows:

(1) Its ultraviolet spectrum in iso-octane had a $\lambda_{max}$ at about 278 m$\mu$ and a specific extinction coefficient $$(\alpha = E_{1\ cm.}^{1\%}) \text{ of } 215$$

The shape and position of the absorption maximum and inflection points for this spectrum was the same as for the spectrum of the hydrocarbon alloocimene. That is, besides the $\lambda_{max}$ at 278 m$\mu$, there were inflection points at about 270 and 286 m$\mu$ just as alloocimene shows. The specific extinction coefficient of the alcohol was of the same comparative magnitude as that of alloocimene.

(2) The infrared spectrum showed major absorptions at the following wavelengths: 6.95, 7.28, 7.90, 8.14, 8.52, 9.50, 10.13, 10.55, 11.50, 11.93, 12.30 and 12.80$\mu$. The wavelengths underlined are those of absorption bands common to both the alcohol produced here and alloocimene. The absorptions at 9.50 and 10.13$\mu$ form a broad band which shows the presence of a primary alcohol.

The viscous semi-resinous distillation residue was alloocimene alcohol polymer since it possessed an ultraviolet spectrum showing $\lambda_{max}$ at 242 m$\mu$, just like that of alloocimene polymer. Furthermore, when distilled fractions rich in alloocimene alcohol were heated at 210° C. for ten hours, the product was shown to contain a much lower extinction coefficient than before heating and the absorption maximum at 242 m$\mu$ characteristic of alloocimene type polymers had become quite strong.

Analytical data comprising fractionation data and data from the spectra of the fractions showed that there was present in the crude isomerization product:

|  | Percent |
|---|---|
| Unknowns | 5.7 |
| Pyronene alcohols | 25.0 |
| Perillyl alcohol | 36.0 |
| Alloocimene alcohol | 15.3 |
| Distillation residue | [1]15.0 |
| Overall loss | 3.0 |
| Total | 100.0 |

[1] Largely alloocimene alcohol polymer.

EXAMPLE 2

Pure myrtenol was sealed in evacuated glass capsules. The capsules were then heated at 257–265° C. in an oil bath. Infrared spectra on samples taken from capsules heated for periods of from one to five hours showed the isomerization to be essentially complete after three hours' heating at this temperature. Very little pyronene or alloocimene alcohols were present as compared with material pyrolyzed in the vapor phase as in Example 1. The yield of perillyl alcohol was about 47% as determined by spectrophotometric analysis by comparison of infrared spectra of the pyrolyzed myrtenol wtih the spectrum of pure perillyl alcohol produced by efficient fractionation of crude pyrolysis products as in Example 1.

This product contained a substantial amount of polymer resulting from polymerization of the alloocimene alcohol in the liquid phase. This polymer is characterized by a strong ultraviolet absorption band with maximum absorption at about 242 m$\mu$.

EXAMPLE 3

About 50 grams of pure myrtenol was refluxed at 220–240° C. at atmospheric pressure for a total of 13½ hours. Infrared spectra were run on samples of the reaction mixture taken after 2, 10 and 13½ hours of refluxing. These showed that the isomerization was essentially complete after 10 hours. Very little pyronene or alloocimene alcohols were present. The yield of perillyl alcohol was about 52.5% as determined by infrared analysis employing as an optical standard pure perillyl alcohol produced by fractionation of crude myrtenol pyrolysis mixtures as in Example 1. On removal of volatile material in vacuum, primarily perillyl alcohol, there remained a residue substantially non-volatile at 160° C. at 10 mm. This semi-resinous product, characterized by its showing infrared absorption bands located in the region where primary alcohols show absorptions and possessing a strong ultraviolet absorption with $\lambda_{max}$ at 242 m$\mu$, consisted of alloocimene alcohol polymer.

EXAMPLE 4

Pure myrtenyl acetate, $n_D^{25}$ 1.4706, $\alpha = -46°$ (10 cm. tube), (1056 grams) was refluxed at 223–242° C. for 26 hours. Infrared spectra on the reaction mixture at various intervals showed the progress of the isomerization. During the pyrolysis, some acetic acid was formed. After 11 hours of heating, the presence of the acetic acid had lowered the pot temperature below 230° where little isomerization occurred. From then on, the acetic acid was distilled off to maintain a pot temperature above 230° C. Very little change in the composition took place in the last 7 hours of heating.

The reaction mixture was then fractionated through an efficient column packed with glass helices. The distillation was conducted at 10 mm. absolute pressure, to a pot temperature of 210° C., and then the pressure was reduced to 2.5 mm., and the distillation continued to a final pot temperature of 220° C. Twenty-three fractions were collected and these ranged in size from 9 to 51 grams. Infrared and ultraviolet spectra were made for most of the fractions, and these indicated the number of major pyrolysis products as well as their composition and quantity. The following compounds in order of their increasing boiling points were found to be present:

(A) Hydrocarbons comprised the material boiling 39–62.5° C. at 10 mm. The absence of oxygen-containing groups was shown from the infrared spectra of the fractions in this boiling range.

(B) $\alpha$-Pyronene and $\beta$-pyronene acetates and unidentified esters were the major components of the fractions boiling at 104–120° C., at 10 mm. Infrared spectrophotometric analysis showed the presence of the functional groups as well as the pyronene structures. Ultraviolet spectrophotometric analysis confirmed the presence of the pyronenes by a $\lambda_{max}$ at 264 m$\mu$. The concentration of the pyronene acetates was not over 20% in the total fractions containing them.

(C) Perillyl acetate, $n_D^{25}$ 1.4780, was the major compound boiling at 124° C., at 10 mm. It was characterized and identified from its infrared spectrum as follows:

(1) The major absorption bands were at the following wavelengths ($\mu$): 5.77, 6.12, 6.95B, 7.34B, 8.05B, 8.52, 8.7, 9.58, 9.77, 10.42, 10.9, 11.25B, 11.8, and 12.3. The absorptions marked "B" are the center points of broad bands.

(2) The primary acetate absorptions were those at 5.77, 8.05, 9.58, and 9.77$\mu$.

(3) The $CH_2=C<$ absorptions were at 6.12 and 11.25$\mu$.

(4) The trisubstituted ethylene group was represented by the absorption at 12.3$\mu$.

Perillyl acetate has a mild fruity odor.

(D) Alloocimene acetate, or 2-methyl-2,4,6-octatriene-6-carbinol acetate, $n_D^{25}$ 1.5230, was the primary compound boiling at 102° C., at 2.5 mm. It was characterized and identified from its infrared and ultraviolet spectra as follows:

(1) The major infrared absorption bands were at the following wavelengths ($\mu$): 5.76, 6.08, 6.92, 7.3, 8.05B, 9.58, 9.82, 10.15, 10.45, 11.42, 11.9, 12.34, 12.52. The absorption marked "B" is the center point of a broad band.

(2) The ester group is represented by the bands at 5.76, 8.05, 9.58 and 9.82$\mu$.

(3) The ultraviolet absorption maximum $\lambda_{max}$ was at 272 m$\mu$ with a specific extinction coefficient $$(\alpha = E_{1\ cm.}^{1\%}) \text{ of } 163$$

in iso-octane. The spectrum also had inflection points at 267 and 285 mμ to form a curve of the same shape and in the same location as produced from allo-ocimene itself.

A large viscous, semi-resinous distillation residue was shown to contain alloocimene acetate polymer from its ultraviolet spectrum which had a $\lambda_{max}$ at 240 mμ and a specific extinction coefficient of 29 and also inflection points at 235 and 248 mμ. This type curve is characteristic of the basic alloocimene polymer structure.

Analytical data comprising fractionation and spectral data showed that there was present in the crude isomerization product:

|  | Percent |
|---|---|
| Hydrocarbons | 1.5 |
| Unknown acetates and pyronene acetates | 9.5 |
| Perillyl acetate | 43.5 |
| Alloocimene acetate | 4.0 |
| Distillation residue (largely alloocimene acetate polymer) | 32.0 |
| Loss, largely acetic acid and hydrocarbons | 9.5 |
| Total | 100.0 |

EXAMPLE 5

Myrtenal (450 grams) was pyrolyzed in the vapor phase by adding the liquid dropwise at 2–3 cc. per minute down the side of a vertical ¼" standard iron pipe maintained at 380–400° C. The temperature was determined from a thermocouple inserted down the center of the pipe. The product contained about 25 grams of a solid polymer that was removed by filtration.

An infrared spectrogram on the liquid portion of the pyrolysate showed:

(1) That it contained very little unchanged myrtenal;
(2) A broad absorption band at 13.6μ, characteristic of basic α- and β-pyronene structures;
(3) A $CH_2=C<$ aborption at 11.2μ;
(4) Carbon to carbon conjugation absorptions at 6.35 and 6.4μ; and
(5) Several absorptions between 5.75 and 6.15μ which represented different conjugated carbonyls and a $CH_2=C<$ group.

The product was fractionally distilled through an efficient column packed with glass helices. The distillation was conducted at 10 mm. to a pot temperature of 200° C., and then the absolute pressure was maintained at 1–2 mm. to a final pot temperature of 220° C. Twelve fractions were collected throughout the distillation and these ranged in size from 13 to 24 grams. Infrared and ultraviolet spectrograms were made for all of the fractions and these indicated the number of major pyrolysis products as well as their composition and quantity. The following compounds in order of the increasing boiling points were found to be present:

(A) Highly conjugated carbonyl material of unidentified structure was the major component of the fraction boiling from 50–76° C., at 10 mm. The ultraviolet spectrogram in iso-octane of this material showed a $\lambda_{max}$ at 237 mμ with a specific extinction coefficient $$(\alpha = E^{1\%}_{1\,cm.})\ of\ 38.2$$

and a $\lambda_{max}$ at 271 mμ with an α of 22. These data indicated the presence of a highly conjugated system(s). The infrared spectrogram had major absorption bands at the following wavelengths (μ): 5.87, 5.97, 6.10, 6.30, 6.90, 7.00, 7.30, 7.65, 8.26, 8.50, 8.70, 9.10, 9.35, 11.25, 12.07, 13.45, 14.35, 14.54. The following structural features were indicated from the presence of certain absorption bands:

| | |
|---|---|
| 5.87 and 5.97μ | Conjugated carbonyl. |
| 6.10 and 11.25μ | $CH_2=C<$. |
| 13.45μ | Symmetrically disubstituted ethylene grouping. |

(B) 5,5,6 - trimethyl-1,3 - cyclohexadiene - 1 - carboxyaldehyde was the primary constituent of fractions boiling at 76–84° C., at 10 mm., $n_D^{25}$ 1.4903–1.4979. These fractions had a sharp aldehyde-like odor. Ultraviolet and infrared spectrograms on these fractions indicated the presence of one major compound. The ultraviolet spectrograms had a $\lambda_{max}$ at 297 mμ and an α of 24.8 in iso-octane. The position of the $\lambda_{max}$ indicated a linearly conjugated system of the type $C=C-C=C-C=O$. Safranic acid and β-ionone, which have this structural system, yield ultraviolet spectrograms with a $\lambda_{max}$ between 280 and 300 mμ, the exact position depending upon the solvent employed. The $\lambda_{max}$ of 5,5,6-trimethyl-1,3-cyclohexadiene-1-carboxaldehyde was at 305 mμ in methanol with an α of 25. The shift in the $\lambda_{max}$ with the change in solvent indicated a conjugated carbonyl system. The infrared spectrograms of these fractions boiling at 76–840 C., at 10 mm., had major absorptions at the following wavelengths (μ): 5.85, 5.95, 6.42, 6.86, 7.11, 7.30, 7.37, 7.57, 7.95, 8.20, 8.56, 8.68, 8.85, 9.23, 9.53, 9.68, 9.87, 10.02, 10.97, 11.23, 11.80, 12.40, 13.48. From the infrared absorptions, the following structural features were indicated:

| | |
|---|---|
| 5.85 and 5.95μ | Conjugated carbonyl. |
| 6.42μ | Carbon to carbon conjugations. |
| 13.48μ | Symmetrically disubstituted ethylene group. |

The symmetrically disubstituted ethylene absorption is explained from the fact that some highly conjugated carbon-to-carbon systems produce an infrared absorption representing a resultant 2,3-double bond from a 1,4-unsaturated system.

If the pyrolytic cleavage of myrtenal follows the rest of the myrtenyl series, then this linearly conjugated system is present in one of these types of compounds: pyronene, p-menthane, acyclic. If it were part of either of the latter two basic structures, it should boil higher than perillyl aldehyde or 7-methyl-2,4,6-octatriene-2-carboxaldehyde, which is not the case. Therefore, it is part of the pyronene system. Thus, from the data presented, the compound is 5,5,6-trimethyl-1,3-cyclohexadiene-1-carboxaldehyde.

Further evidence for the structure of 5,5,6-trimethyl-1,3-cyclohexadiene-1-carboxaldehyde was derived from its acetone condensation product. Five grams of this compound was added to a mixture of 20 grams of acetone and 0.25 gram of solid sodium hydroxide at 25–30° C. The reactants were stirred for 2 hours after all the aldehyde had been added. The mixture was then concentrated at about 150 mm. to a pot temperature of 100° C. The residue was washed with sodium carbonate solution to yield a product which had an odor reminiscent of hay and raspberries. The infrared spectrum of this product was similar to the spectra of β-ionone which provided more proof of the proposed structure of 5,5,6-trimethyl-1,3-cyclohexadiene-1-carboxaldehyde, because the basic structures of β-ionone and this compound would be very much alike. The ultraviolet spectrum of the product in iso-octane had a $\lambda_{max}$ at 226 mμ with an α of 21.3 and a $\lambda_{max}$ at 327 mμ with an α of 40.3. The shift in the $\lambda_{max}$ from 297 mμ for the original carbonyl compound to 327 mμ for the acetone condensation product indicated the longer linearly conjugated system that was formed by the condensation with acetone.

(C) 1,6,6 - trimethyl-1,3-cyclohexadiene-2-carboxaldehyde and/or (D) 2,3,3 - trimethyl-1,4-cyclohexadiene-1-carboxaldehyde was the major compound in the fractions boiling at 91–92.5° C., at 10 mm. ($n_D^{25}$ 1.4853–1.4861). It was identified from its ultraviolet and infrared spectra as follows:

(1) The ultraviolet spectrum of the fraction containing the compound in the greatest concentration had a $\lambda_{max}$ at 237 m$\mu$ with an $\alpha$ of 33.8 in iso-octane. The $\lambda_{max}$ for the same material in methanol was at 243 m$\mu$ with an $\alpha$ of 34.3. The shift in the $\lambda_{max}$ indicated a conjugated carbonyl system. The position of the $\lambda_{max}$ would tend to support the structure in which the carbon-to-carbon double bonds were not conjugated (D). However, very little is known about the ultraviolet spectra of compounds with this conjugated system:

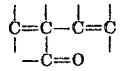

(2) The infrared spectrogram of the same fraction described in (1) had major absorption bands at the following wavelengths ($\mu$): 5.85 (broad), 6.37, 6.86, 7.05, 7.33, 7.95, 8.55, 8.80, 9.48, 9.66, 9.78, 10.33, 10.53, 12.05, 12.40, 12.81, 12.90 and 13.55.

By summarizing the spectral data and applying the same line of reasoning as is presented in the last paragraph of section (B) of this example, the compound boiling at 91–92.5° C., at 10 mm., is either (C) or (D).

The acetone condensation product was prepared by the same procedure as that described for compound (B). It had a hay-like odor. The infrared spectrogram was similar to that of $\beta$-ionone and the ultraviolet spectrogram had a $\lambda_{max}$ at 278 m$\mu$ in iso-octane (ultraviolet spectrograms of $\beta$-ionone in hexane has a $\lambda_{max}$ at 280 m$\mu$).

(E) Perillylaldehyde was the major compound boiling from 101° C., at 10 mm., to 75° C., at 1.3 mm., $n_D^{25}$ 1.5042–1.5059; literature, $b_{10}$ 104–105° C., $n_D^{25}$ 1.5049–1.5060. The compound had a strong cumin-like odor as is reported in the literature.

The intensely sweet perillylaldehyde oxime was prepared as definite identification of compound (E). The oxime was prepared by adding a solution of 25 grams of hydroxylamine hydrochloride plus 50 grams of sodium acetate in 75 cc. of water to a solution of 21.5 grams of perillylaldehyde in 100 cc. of methanol. The temperature was maintained at 25–30° C. The precipitate which formed was intensely sweet. The solid was separated by filtration and then recrystallized from light naphtha to give 21 grams (90% yield) of perillylaldehyde oxime, M. P. 101° C. (uncorrected), $[\alpha]_D^{25}=0°$. The ultraviolet spectrogram of the oxime in methanol had a $\lambda_{max}$ at 233 m$\mu$ with an $\alpha$ of 124. The infrared spectrogram of the oxime had major absorption bands at the following wavelengths ($\mu$): 3.0, 6.08, 7.67, 7.75, 8.45, 10.20, 10.48, 10.67, 11.23, 12.20, 12.30, 12.47, 14.10.

The crystalline oxime itself did not have a sweet taste perhaps because of low or slow solubility, but when dissolved in an organic hydroxylic solvent, the solution was intensely sweet.

Further characterization of perillylaldehyde was made from its ultraviolet and infrared spectra as follows:

Ultraviolet: $\lambda_{max}$ 226 m$\mu$; $\alpha$, 91.5 in iso-octane
$\lambda_{max}$ 230 m$\mu$; $\alpha$, 91.6 in methanol The displacement of the $\lambda_{max}$ with a change in solvent indicated a conjugated carbonyl system. From the rules developed by R. Woodward, J. A. C. S. 64, 76 (1942), the $\lambda_{max}$ for perillylaldehyde in methanol would be predicted at about 235 m$\mu$. Therefore, the actual value of the $\lambda_{max}$, 230 m$\mu$, added proof to the presence of perillylaldehyde.

Major infrared absorption bands ($\mu$): 5.93, 6.02, 6.87, 6.95, 7.02, 7.15, 7.26, 7.66, 8.05, 8.22, 8.55, 8.72, 9.58, 9.90, 10.00, 10.12, 10.30, 10.58, 10.87, 11.23 (broad), 12.27, 12.95, 14.50. From the infrared absorptions the following structural features were indicated:

| | |
|---|---|
| 5.92$\mu$ | Conjugated carbonyl. |
| 6.02 and 11.23$\mu$ | $CH_2=C<$ group. |
| 12.27 and 12.95$\mu$ | Trisubstituted ethylene group. |

(F) 2-methyl-2-,4,6-octatriene-6-carboxaldehyde, alloocimene aldehyde, was present in the fraction boiling at 90° C. at 1 mm. It was identified and characterized as follows:

(1) The ultraviolet spectrum of the fraction had $\lambda_{max}$ at 275 m$\mu$ with an $\alpha$ of 35.9 in iso-octane. The position and shape of the curve corresponded to that to be expected of an alloocimene structure.

The acetone condensation product from this fraction was prepared by the same procedure employed for compound (B). The ultraviolet spectrogram of the acetone condensation product had a $\lambda_{max}$ at 279 m$\mu$ with an of 44.6 in methanol. $\beta$-ionone has a similar ultraviolet spectrum. The infrared spectrogram of this condensation product was also somewhat similar to the spectra of $\beta$-ionone. The product had a mint-like odor.

A glassy distillation residue was obtained which has the following properties:

(1) The ultraviolet spectrum of the residue in ether had distinct $\lambda_{max}$ but there was an inflection point at 227 m with an $\alpha$ of 56 and one at 268 m$\mu$ with an $\alpha$ of 18.2.

(2) The infrared spectrum of the residue was typical of a polymeric material in that there was no distinct bands between 8 and 14$\mu$ but there was a broad conjugated carbonyl absorption at 5.7$\mu$.

(3) This residue was insoluble in sodium carbonate solution but was soluble in oxygenated organic solvent A summary of the fractionation and spectral data of the distillates showed the following approximate yield of products from this reaction:

| | Percent |
|---|---|
| Low boiling conjugated carbonyl material | 5 |
| 2,3,3-trimethyl-cyclohexadiene-1-carboxaldehydes | 28 |
| Perillylaldehyde | 31 |
| 2-methyl-2,4,6-octatriene-6-carboxaldehyde | 2 |
| Distillation residue | 29 |
| Loss, due to low boiling compounds | 5 |
| Total | 100 |

An infrared spectrum on the total liquid pyrolysate analyzed 38% perillylaldehyde which indicates that the compound and probably others polymerized somewhat on distillation.

From this experiment, the reaction may be summarized as presented in the flow sheet.

*Flow sheet*

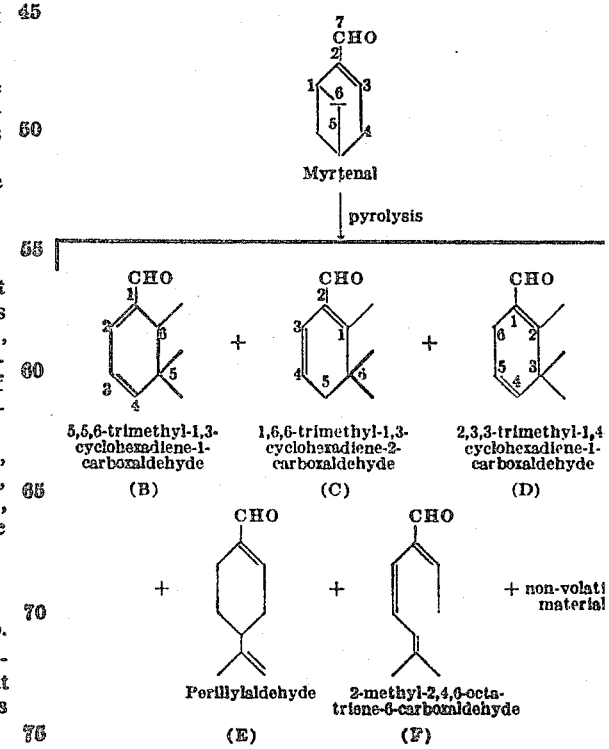

EXAMPLE 6

Myrtenal was refluxed for one and one-half hours at 225–230° C. An infrared spectrogram on the product showed very little change in most absorption bands. However, there was a new absorption band at 6.07μ due to a new conjugated carbonyl group and/or a $CH_2=C<$ group. There was also a new broad absorption band at 11.45μ due to a $CH_2=C<$ group. The product contained some acids, probably 'due to air oxidation of the conjugated carbonyl groups at the elevated temperature. A much longer period of refluxing is necessary for a greater conversion to perillylaldehyde and the other pyrolysis products. Also, an antioxidant should be added or the reaction carried out in an inert atmosphere such as nitrogen to prevent the formation of acidic material.

EXAMPLE 7

Several sealed glass capsules, each containing a small quantity of myrtenal, were heated in an oil bath at 265–272° C. Individual capsules were removed at ¼, ½, 1 and 2 hour intervals. The capsules were cooled and infrared spectrograms made on the products they contained. The spectra of the products heated for increasing periods of time showed a gradual disappearance of the myrtenal and at the same time the appearance of perillylaldehyde. A maximum yield of about 40% perillylaldehyde was attained in one hour. The formation of the perillylaldehyde was shown by the appearance of infrared absorption bands at the following wave-length (μ): 6.03, 8.58, 10.86, 11.23, 12.25, 12.95.

EXAMPLE 8

Myrtenal was pyrolyzed in the vapor phase by the same procedure described in Example 5 except that in this case the temperature was maintained at 350° C. An infrared spectrogram on the product showed a 41% yield of perillylaldehyde, about 20% unchanged myrtenal and less pyronene and alloocimene derivatives than at the higher temperature range employed in Example 5.

It will be appreciated that the foregoing examples are intended to be illustrative of the invention and to describe the best modes of carrying out the invention as now known. Obviously, many variations therein can be carried out without departing from the invention. Thus, where esters are pyrolyzed, any suitable ester can be used, such as the propionate, butyrate, benzoate or laurate. Normally the acetate will be employed, however, unless some other particular ester of the isomerized material is desired. It is, of course, possible and may be desirable in some cases to form the desired ester of the isomerizate by an esterification step subsequent to the pyrolysis.

Where the term "pinene structure" is used in the claims, it refers to the carbon-carbon structure of those compounds in which the unbroken carbon-carbon structure involving the pinene nucleus is limited to the carbon-carbon structure of α-pinene.

Having described the invention, what is claimed is:

1. The process which comprises heating a myrtenyl compound of the general formula

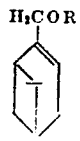

wherein R is a monovalent radical selected from the class consisting of hydrogen and a monovalent organic radical attached through a carbon atom thereof to the oxygen atom shown, at a temperature in the range of 225° C. to 700° C. for a time sufficient to cause isomerization thereof to monocyclics and acyclics wherein the olefinic bond retains its allylic position to the exocyclic substituent shown.

2. The process which comprises heating a myrtenyl compound of the general formula

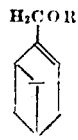

wherein R is a monovalent radical selected from the class consisting of hydrogen and a monovalent organic radical attached through a carbon atom thereof to the oxygen atom shown, at a temperature in the range of 225° C. to 700° C. for a time sufficient to cause isomerization thereof to monocyclics and acyclics wherein the olefinic bond retains its allylic position to the exocyclic substituent shown and recovering from the isomerizate a fraction enriched in a substituted alloocimene isomeric with the starting material having the —$CH_2OR$ substituent at the 6-position.

3. The process which comprises heating a myrtenyl compound of the general formula

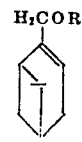

wherein R is a monovalent radical selected from the class consisting of hydrogen and a monovalent organic radical attached through a carbon atom thereof to the oxygen atom shown, at a temperature in the range of 225° C. to 700° C. for a time sufficient to cause isomerization thereof to monocyclics and acyclics wherein the olefinic bond retains its allylic position to the exocyclic substituent shown and recovering from the isomerizate a fraction enriched in a substituted pyronene isomeric with the starting material wherein the substituent is the same as the exocyclic substituent shown.

4. The process which comprises heating a myrtenyl compound of the general formula

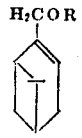

wherein R is a monovalent radical selected from the class consisting of hydrogen and a monovalent organic radical attached through a carbon atom thereof to the oxygen atom shown at a temperature in the range of 225° C. to 700° C. for a time sufficient to cause isomerization thereof to monocyclics and acyclics wherein the olefinic bond retains its allylic position to the exocyclic substituent shown and recovering from the isomerizate a fraction enriched in a 7-substituted 1,8-p-menthadiene isomeric with the starting material wherein the substituent is the same as the exocyclic substituent shown.

5. The process which comprises heating a myrtenyl compound of the general formula

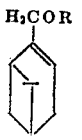

wherein R is a monovalent radical selected from the class consisting of hydrogen and a monovalent organic radical attached through a carbon atom thereof to the oxygen atom shown at a temperature in the range of 225° C. to 700° C. for a time sufficient to cause isomerization thereof to monocyclics and acyclics wherein the olefinic bond retains its allylic position to the exocyclic substituent shown and recovering from the isomerizate separate fractions enriched in (1) a 6-substituted alloocimene isomeric with the starting material wherein the substituent is the same as the exocyclic substituent shown, (2) a substituted pyronene isomeric with the starting material wherein the substituent is the same as the exocyclic substituent shown, and (3) a 7-substituted 1,8-p-menthadiene isomeric with the starting material wherein the substituent is the same as the exocyclic substituent shown.

6. The process which comprises heating myrtenol at a temperature in the range of 225° to 700° C. for a time sufficient to cause isomerization of the myrtenol to monocyclic and acyclic alcohols wherein the olefinic double bond retains its allylic position to the hydroxy group.

7. The process which comprises heating myrtenol at a temperature in the range of 225° to 700° C. for a time sufficient to cause isomerization of the myrtenol to monocyclic and acyclic alcohols and recovering perillyl alcohol from the isomerizate.

8. The process which comprises heating myrtenol at a temperature in the range of 225° to 700° C. for a time sufficient to cause isomerization of the myrtenol to monocyclic and acyclic alcohols and recovering from the isomerizate separate fractions enriched in (1) perillyl alcohol, (2) the pyronene alcohols present in the isomerizate wherein the olefinic double bond retains its allylic position to the hydroxy group, and (3) 2-methyl-2,4,6-octatriene-6-carbinol.

9. The process which comprises heating myrtenyl acetate at a temperature in the range of 225° C. to 700° C. for a time sufficient to cause isomerization of the myrtenyl acetate to monocyclics and acyclics, and recovering from the isomerizate separate fractions enriched in (1) perillyl acetate, (2) the pyronenyl acetates present in the isomerizate wherein the olefinic double bond retains its allylic position to the acetate group, and (3) 2-methyl-2,4,6-octatriene-6-carbinol acetate.

10. A compound selected from the class consisting of those of the general formulae

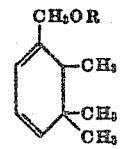

and

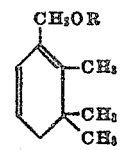

in which R is a radical selected from the class consisting of hydrogen and a monovalent organic radical attached through a carbon thereof to the oxygen atom shown.

References Cited in the file of this patent
UNITED STATES PATENTS

| | | |
|---|---|---|
| 2,428,352 | Bain et al. | Oct. 7, 1947 |
| 2,453,110 | Bain et al. | Nov. 9, 1948 |
| 2,537,638 | Kitchen | Jan. 9, 1951 |

OTHER REFERENCES

Fischer et al.: Berichte d. d. c. Ges., vol. 68B (1935) pp. 1730, 1732.